Sept. 22, 1970  J. S. WAUGH  3,530,373
METHODS AND APPARATUS FOR PULSED NUCLEAR MAGNETIC
RESONANCE OF SOLIDS
Filed Sept. 16, 1968  4 Sheets-Sheet 1

INVENTOR:
JOHN S. WAUGH
BY
ATTORNEY

INVENTOR:
JOHN S. WAUGH
BY *Martin M. Santa*
ATTORNEY

INVENTOR:
JOHN S. WAUGH

FIG. 9

United States Patent Office 3,530,373
Patented Sept. 22, 1970

3,530,373
METHODS AND APPARATUS FOR PULSED NUCLEAR MAGNETIC RESONANCE OF SOLIDS
John S. Waugh, Lincoln, Mass., assignor to Massachusetts Institute of Technology, Cambridge, Mass., a corporation of Massachusetts
Filed Sept. 16, 1968, Ser. No. 762,171
Int. Cl. G01n 27/78
U.S. Cl. 324—.5
17 Claims

ABSTRACT OF THE DISCLOSURE

Pulsed nuclear magnetic resonance (NMR) apparatus is programmed to produce magnetic field excitation energy whose amplitude and phase and time sequence are such that the effects of static nuclear magnetic dipole-dipole interactions and/or quadrupolar interactions are averaged to a reduced value; whereas resonance shifts and electron-coupled spin-spin interactions can still be observed in the output signal. The method is particularly useful for investigating solids whose resonance shifts and electron-coupled spin-spin interactions are smaller than, and would otherwise be obscured by, dipole-dipole interactions and/or quadrupolar perturbations. The method consists of adapting the coherent radio frequency modulator found in pulsed NMR apparatus to provide a particular sequence of phase modulated R-F pulses or alternatively to provide a phase modulated R-F pulse in conjunction with a video pulse.

---

The invention herein described was made in the course of a grant sponsored by the National Science Foundation and a contract sponsored by the Joint Services Electronics Programs, (U.S. Army, U.S. Navy and U.S. Air Force).

BACKGROUND OF THE INVENTION

The purpose of this invention is to provide means of observing certain perturbations of the natural magnetic resonance frequencies (Larmor frequencies) of gyromagnetic resonators such as nuclear, electronic and atomic magnetic moments, particularly in solids, under conditions where these perturbations would otherwise be partially or completely masked by static or nearly static magnetic dipolar spin-spin interactions. In particular, the invention provides an accurate measurement of small resonance shifts and electron-coupled spin-spin interactions in solids; that is, to provide what could be termed high resolution NMR of solids.

Perturbations of the Larmor frequencies ("resonance shifts") have been previously observed in liquids and gases (and in certain solids where these shifts are large) by means of steady-state magnetic resonance spectroscopy in which the forced coherent precession of a collection of elementary gyromagnetic elements. caused by the application of a strong, uniform, steady magnetic field (a "Zeeman field"), and a weak steady radio frequency magnetic field, is detected as a function of the strength of the steady field or the value of the applied radio frequency. The same perturbations also manifest themselves in the spontaneous free precessional signal which follows the application of an intense short burst of R-F field in the presence of the Zeeman field. The resonance shifts in question include shifts variously termed "chemical shifts," "knight shifts," "inhomogeneous shifts/broadenings," "$g$-shifts," all of which consist basically in deviations of the effective Zeeman field from its nominal value.

These resonance shifts are often partially or completely obscured by scalar and/or dipolar spin-spin interactions. Two methods have been employed previously to eliminate or reduce the effects of these dipolar interactions without at the same time eliminating the resonance shifts. One of these methods, described by Andrew et al., Nature (London) 182, 1695 (1958) and more recently by Kessemeier et al., Physical Review, 155, 321 (1967), requires the physical rotation of the sample material at a high rate (rotation frequency greater than $T_2^{-1}$, where $T_2$ is the transverse relaxation time due to spin-spin interactions). Rotation is about an axis inclined to the Zeeman field $H_0$ by the "magic angle" 54°44'. For a typical solid, $T_2^{-1} \approx 50\mu$ sec., and a rotation rate approaching one million r.p.m. is required, thus making this method impractical for wide use.

The other method, Lee and Goldburg, Physical Review, 140, A1261 (1965), employs a displacement of the Zeeman field from resonance, $H_0$, and a long burst of radio frequency magnetic field, $2H_1$, perpendicular to the Zeeman field, satisfying the condition $H_1/\Delta H_0 = \sqrt{2}$. This method has various defects which are ameliorated by the present invention:

(a) The required NMR measurements cannot be made during the long burst of radio frequency magnetic field because of its interference with the sensitive measuring apparatus. The required information can therefore be gathered only relatively slowly by many replications (often 100–1000) of the experiment using differing durations of the R-F burst.

(b) The resolution of resonance shifts and electron-coupled spin-spin interactions is reduced by the fact that the two components of the applied burst, $\Delta H_0$ and $2H_1$, since they arise from physically distinct sources, differ in their distribution of values over the finite sample volume, thus not everywhere satisfying the requirement $H_1/\Delta H_0 = \sqrt{2}$.

(c) The reduction of dipolar interactions is limited by "nonsecular" effects which become negligible only when the applied radio frequency field amplitude is made exceedingly large.

Both of these methods, is the process of eliminating the spin-spin interactions, also lose that part of the resonance shifts which depends on the orientation of the solid with respect to the Zeeman field; i.e., the anisotropy of the resonance shift.

The present method differs from the sample spinning method in that the sample material may be kept stationary, and in that intelligence residing in the angle-dependence of resonance shifts is retained. It differs from the Lee-Goldburg method in that the applied burst of magnetic field may occur in short pulses, and a multitude of NMR measurements can be gathered during the short intervals between said pulses. It also differs from the Lee-Goldburg experiment in that the burst of applied magnetic field can be so applied as to minimize the effects of magnetic field nonuniformity over the sample volume. It can also be so programmed as to minimize the nonsecular broadening.

The present method differs from the most widely known NMR methods (CW methods) in that the radio frequency magnetic fields are rapidly modulated in time rather than being steadily applied, and the dependence of the NMR signal on time rather than on applied R-F frequency of Zeeman field strength $H_0$ is what is recorded. That is, it embodies the technology of "pulsed NMR" rather than that of "steady state NMR."

PHYSICAL BASIS OF THE INVENTION

The behavior of the N nuclear magnetic moments $\underset{\sim}{\mu_i}$, $i=1, 2, \ldots N$ in a sample of matter subjected to externally applied magnetic fields is, in general, complicated and follows the laws of quantum mechanics. A rudimentary understanding of the present invention can be obtained, however, on the basis of simple classical laws, as follows:

Consider a particular pair of nuclear gyromagentic moments $$\underset{\sim}{\mu_1} \text{ and } \underset{\sim}{\mu_2}$$

immersed in a strong constant magnetic field $\underset{\sim}{H_0}$, which points along the z-axis of a Cartesian coordinate system. The torque which $$\underset{\sim}{H_0} \text{ applies to } \underset{\sim}{\mu_1} \text{ and } \underset{\sim}{\mu_2}$$

together with the gyroscopic moments $$\underset{\sim}{I_1} \text{ and } \underset{\sim}{I_2}$$

cause $$\underset{\sim}{\mu_1} \text{ and } \underset{\sim}{\mu_2} \text{ to precess about } \underset{\sim}{H_0}$$

at characteristic Larmor angular frequencies $\omega_{01}$ and $\omega_{02}$. We shall assume for the time being that the moments are alike so that $\omega_{01} = \omega_{02} = \omega_0 = \gamma H_0$, where $\gamma$ is the gyromagnetic ratio:

$$\underset{\sim}{\mu} = \gamma \hbar \underset{\sim}{I}$$

Figure 1:
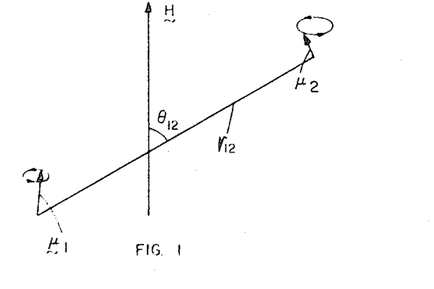
FIG. 1 is a vector representation of a pair of nuclear gyromagnetic moments in the laboratory frame of reference.

This situation is illustrated schematically in FIG. 1.

The magnetic moments are themselves sources of magnetic fields. The total field at the site of $\mu_1$ is, therefore, the vector sum of $$\underset{\sim}{H_0} \text{ and a local field } \underset{\sim}{H_{loc}}$$

arising from $\mu_2$. $\mu_2$ is similarly perturbed by $\mu_1$. The result is that the two moments do not precess independently at $\omega_0$, but rather the coupled pair is described by more complicated normal modes of precession. If each moment has several neighbors, as would typically be true in a sample of matter, the entire coupled system is described by a complicated set of normal modes having a quasi-continuous distribution of frequencies, all of which lie in the neighborhood of $\omega_0$ and which are distributed over a frequency range $\sim \gamma H_{loc}$, where $H_{loc}$ is a typical field of a dipole at its nearest neighbors and is assumed to be much smaller than $H_0$. It is this distribution which it is desired to collapse by making the effects of $H_{loc}$ disappear.

Figure 2:
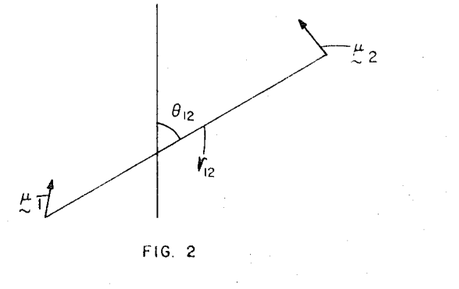
FIG. 2 is a representation of FIG. 1 shown in frozen precession in the rotating frame.

The problem is simplified by viewing the precessions from the vantage point of a coordinate system which rotates about the z-axis at the frequency $\omega_0$ in the same sense as the natural precession. In this coordinate system (the "rotating frame") the spins do not appear to precess under the influence of $H_0$. If the laws of physics are to be valid in this reference frame, one must thus imagine that $H_0$ is effectively zero in it. (FIG. 2). The only fields then apparently acting are the local fields. Their effect is to produce a loss of any original phase relationship between the precessions of $\mu_1$ and $\mu_2$; i.e., they appear to precess with respect to one another at a frequency of the order of $\gamma H_{loc}$. It is important to realize that the rotating frame is so defined mathematically that it rotates only with respect to the nuclear magnetic moments: the internuclear axis $r_{12}$ remains fixed in direction.

The local fields in the rotating frame can be separated into a stationary part and a part which oscillates with zero average at high frequencies $\omega_0$ and $2\omega_0$. The latter part, because of its high frequency, does not cause any cumulative dephasing of $$\underset{\sim}{\mu_1} \text{ and } \underset{\sim}{\mu_2}$$

but only oscillatory perturbations of small amplitude (because $H_{loc} \ll H_0$) which will be ignored. The static part of the local fields is responsible for the effects which it is desired to be eliminated. Its influence can be expressed by the energy of interaction between $$\underset{\sim}{\mu_1} \text{ and } \underset{\sim}{\mu_2}$$

to which it corresponds:

$$\mathcal{H}_d^z = \frac{k}{2r_{12}^3} (3 \cos^2 \theta_{12} - 1)(\underset{\sim}{\mu_1} \cdot \underset{\sim}{\mu_2} - 3\mu_{1z}\mu_{2z}) \quad (1)$$

The basic technique employed involves making $\mathcal{H}_d^0$ in effect oscillatory with zero average, so that its effects vanish in much the same way as those of the intrinsically oscillatory parts of the local fields mentioned above. This could be done by causing the angle $\theta_{12}$ to change appropriately with time, as has been done previously. In the present invention similar ends are accomplished by causing $$\underset{\sim}{\mu_1} \text{ and } \underset{\sim}{\mu_2}$$

to change direction in the rotating frame with time.

A change in direction of $\underset{\sim}{\mu}$ can be brought about by application of a magnetic field, about which $\underset{\sim}{\mu}$ precesses. The object is to make $\underset{\sim}{\mu_1}$ and $\underset{\sim}{\mu_2}$ take on such a sequence of directions that the cumulative effect of $\mathcal{H}_d^0$ over this history vanishes or is very small. Consider as an illustration a situation in which the Cartesian components of $$\underset{\sim}{\mu_1} \text{ and } \underset{\sim}{\mu_2}$$

at some initial time $t=0$ are $\mu_{1x}^0, \mu_{1y}^0, \mu_{1z}^0, \mu_{2x}^0, \mu_{2y}^0, \mu_{2z}^0$. Now apply an intense magnetic field $H_1$ along the x-axis of the rotating frame for just such a length of time that $$\underset{\sim}{\mu_1} \text{ and } \underset{\sim}{\mu_2}$$

both precess about that axis through an angle of 90°. Note that a field along the x-axis of the rotating frame corresponds to a field rotating in the laboratory at the frequency $\omega_0$. The distinction between x- and y-axes corresponds in the laboratory to a phase difference of 90°. In practice one usually employs an oscillating field from a fixed coil energized by an R-F source rather than a rotating one. Such an oscillatory field is equivalent to two counterrotating fields of equal amplitude. The one of these which rotates oppositely to the natural precesion of the moments represents a rapidly oscillatory perturbation whose effects can be ignored.

After the 90° field pulse, the components of magnetic moment for either nucleus are as follows:

$$\mu_x = \mu_x^0$$
$$\mu_y = -\mu_z^0$$
$$\mu_z = \mu_y^0$$

and $\mathcal{H}_d^0$ and, therefore, be expressed in terms of $\mu_x^0$, $\mu_y^0$ and $\mu_z^0$, as $$\mathcal{H}_d^y = \frac{1}{2r_{12}^3} (3 \cos^2 \theta_{12} - 1)(\underset{\sim}{\mu_1^0} \cdot \underset{\sim}{\mu_2^0} - 3\mu_{1y}^0 \mu_{2y}^0)$$

After a certain time sufficiently short that $H_d^0$ has essentially no effect on the directions of $$\underset{\sim}{\mu_1} \text{ and } \underset{\sim}{\mu_2}$$

apply a second pulse of magnetic field in the rotating frame whose effect is to bring $$\underset{\sim}{\mu_1} \text{ and } \underset{\sim}{\mu_2}$$

into directions perpendicular both to $$\underset{\sim}{\mu_1^0} \text{ and } \underset{\sim}{\mu_2^0}$$

and to the directions which they occupied after the first pulse. This could be accomplished, for example, by a 90° pulse along the $-x$-axis (opposite to the initial pulse, i.e., out of phase with it by 180° in the laboratory), immediately followed by a 90° pulse along the $y$-axis (a pulse in phase quadrature with the first pulse in the laboratory). The result is $$\mu_x = -\mu_z^0$$
$$\mu_y = \mu_y$$
$$\mu_z = \mu_x^0$$

and $$\mathcal{H}_d^x = \frac{1}{2r_{12}^3}(3\cos^2\theta_{12} - k)(\underset{\sim}{\mu_1^0} \cdot \underset{\sim}{\mu_2^0} - 3\mu_{1x}^0 \mu_{2x}^0)$$

After a certain time, restore each moment to its initial orientation by means of a 90° pulse along the $-y$-axis. $\mathcal{H}_d^0$ now is restored to the form of Equation 1.

Now suppose that the intervals during which $\mathcal{H}_d^0$ has each of its listed values are equal. Call them $\tau$. By hypothesis, the time $\tau$ has been chosen sufficiently short that the dipolar local fields have caused essentially no precession, and, therefore, the expressions given for $\mathcal{H}_d^0$ during the separate intervals in terms of $$\underset{\sim}{\mu_1^0} \text{ and } \underset{\sim}{\mu_2^0}$$

are essentially valid. The cumulative effect of the local fields in time $3\tau$ is then replaceable by the average of the dipolar interactions during this time. The average of $\mathcal{H}_d^z$, $\mathcal{H}_d^y$ and $\mathcal{H}_d^x$ is $$\overline{\mathcal{H}_d} = \frac{k}{2r_{12}^3}(3\cos^2\theta_{12} - 1)$$

$$\{\underset{\sim}{\mu_1} \cdot \underset{\sim}{\mu_2} - (\mu_{1z}\mu_{2z} + \mu_{1y}\mu_{2y} + \mu_{1x}\mu_{2x})\} = 0$$

That is, the effects of the local fields have been cancelled. The fluctuations of the interaction energy among the values $\mathcal{H}_d^x$, $\mathcal{H}_d^y$ and $\mathcal{H}_d^z$ is rapid and produces only oscillatory effects.

It is to be understood that the particular sequence of magnetic field pulses described here for purposes of illustration are not unique. The methods encompassed by this invention include any sequence of time-varying applied magnetic fields so chosen that the average of the dipolar energy of interaction over short times vanishes or essentially vanishes. It is also to be understood that small adjustments of the fields and their directions and timing would normally be made in order to compensate empirically and partially for the fact that the precession of $$\underset{\sim}{\mu_1} \text{ and } \underset{\sim}{\mu_2}$$

during the cycle of pulses in finite (though small) and not actually zero.

Now consider the possibility that the two moments $$\underset{\sim}{\mu_1} \text{ and } \underset{\sim}{\mu_2}$$

may have slightly different natural precession frequencies in $H_0$, for example, because of the presence of a chemical shift. If the difference is small, the difference in Larmor frequencies $\omega_{01}$ and $\omega_{02}$ obeys $$\delta = |\omega_{01} - \omega_{02}| < \gamma H_{loc}$$

and $\delta \ll \gamma H_1$ where $H_1$ is a typical strength of external pulse field to be applied. Under these conditions a pulse which causes $\mu_1$ to rotate through a given angle will have essentially the same effect on $\mu_2$ as well.

The presence of the shift in frequency can be regarded as producing in the rotating frame an additional contribution to the energy of each moment. For $\mu_1$, say, this is $$\mathcal{H}_c^z = \frac{1}{\gamma}\Delta_1 \mu_{z1}$$

Starting with $$\underset{\sim}{\mu_1} = \underset{\sim}{\mu_1^0}$$

and proceeding as above, one finds the average effect of the shift over a cycle of pulses can be represented by $$\overline{\mathcal{H}_c} = \frac{\Delta_1}{\gamma} \cdot \frac{1}{3}(I_{x1} + I_{y1} + I_{z1})$$

which does not vanish. It, in fact, causes a long-term precession of $\mu_1$, at angular frequency $\Delta_1/\sqrt{3}$, about an axis in the rotating frame which makes equal angles with the $x$, $y$ and $z$ axes. Resonance shifts such as $\Delta_1$ can, therefore, be detected even in the presence of normally much stronger effects due to dipolar local fields, inasmuch as the latter effects are eliminated in the average, whereas the former are not.

Other contributions to the energy of the spins are possible. It is easily seen that the so-called "scalar coupling"

$$\mathcal{H}_J = J_{12}\underset{\sim}{\mu_1} \cdot \underset{\sim}{\mu_2}$$

is unaffected by the pulse sequence, and its effects are thus fully preserved. The interaction of a nuclear quadrupole moment with an axially symmetric local electric field gradient, this interaction being small compared to the interaction between a moment and the strong magnetic field $H_0$, takes the form (for nucleus 1)

$$\mathcal{H}_Q = A_1(\underset{\sim}{I_1} \cdot \underset{\sim}{I_1} - 3I_{z1}^2)$$

It is easily seen that $\mathcal{H}_q$ has its effects eliminated in the same way as $\mathcal{H}_d$.

In making use of the above physical phenomena, a sequence ("cycle") of magnetic field pulses having the desired property is applied repeatedly. The duration of each cycle is made small so as to minimize the above-mentioned precessions of $\mu_1$ and $\mu_2$ during the cycle, and the total duration of the experiment is made sufficiently long to reveal the cumulative effects of $\mathcal{H}_c$ and $\mathcal{H}_J$. (Since there are numerous cycles of pulses having the desired properties, it is permissible to intersperse cycles of two or more different kinds during the course of an experiment.) During the experiment the precession of the resultant magnetic moment of the sample $\underset{\sim}{\mu} = \underset{\sim}{\mu_1} + \underset{\sim}{\mu_2} + \ldots$ is measured by means of the signal which its precessing components induce in a detector (coil) at frequencies in the neighborhood of $\omega_0$. During a given cycle of pulses this resultant moment is reoriented violently. To isolate the slow additional precessional precession induced by, e.g., $\mathcal{H}_c$ and $\mathcal{H}_J$, it is useful to sample the magnetization only once per cycle, at a corresponding point in each cycle.

According to a well-established theorem, the time development of the free magnetization signal from a spin system where Hamiltonian is $\mathcal{H}$ bears a one-to-one mathematical relaionship to the conventional unsaturated slow passage NMR absorption spectrum of the same system obtained in conventional NMR spectrometers. Each of these functions is a Fourier transform of the other. Thus, from the sampled time dependent magnetization signal (which develops as though freely under the influence of $\mathcal{H}$) obtained as described above, it is possible to compute by well defined methods the ordinary absorption spectrum which would be exhibited by a system having $\mathcal{H} = \overline{\mathcal{H}}$. Inasmuch as the signal obtained is independent of $\mathcal{H}_d^0$ and $\mathcal{H}_Q$, the computed absorption spectrum is the same as would be obtained from the same sample had the dipolar and quadrupolar interactions somehow not been present.

A discussion of the quantum-mechanical theory of these effects and their refinements can be found in the literature. Its rudiments are as follows:

Imagine that the system of spins has been initially prepared in a quantum state described by the wave function $|0\rangle$. We shall tacitly assume later that this state is representative of a canonical ensemble at equilibrium in the Zeeman field $H_0$ at temperature T. The system is contin-uously acted upon by its internal Hamiltonian $\mathcal{H}$ and, from time to time, by bursts of magnetic field energy. These bursts will be, for simplicity, considered to be arbitrarily short in duration $t_w$ and arbitrarily intense in such a way that the energy dissipated in the burst is finite. They occur at times which will be denoted by $\tau_1$, $\tau_1+\tau_2$, $\tau_1+\tau_2+\tau_3$, . . . . The effect of a particular pulse, the $k_{th}$ one, on the state of the system at that moment, $|t\rangle$, will be represented by saying that the new state after the pulse is $P_k|t\rangle$, where $P_k$ is a suitable operator. When the pulse is brief and intense, so that the effect of $H_0$ during its occurrence is negligible, $$P_k = \exp\left[-i\theta_k(\alpha_k I_x + \beta_k I_y + \delta_k I_z)\right]$$

where $\theta_k$ is a nutation angle depending on the intensity and duration of the burst, $\alpha_k$, $\beta_k$ and $\gamma_k$ are direction cosines describing the direction of the burst field with respect to the Cartesian axes $(x, y, z)$ of the rotating reference frame, and $I_x$, $I_y$, $I_z$ are the components of resultant spin of those spins which are nutated by the burst:

Immediately after the $n_{th}$ burst, the state of the system is $$|T\rangle = P_n D_n(\tau_n) P_{n-1} D(\tau_{n-1}) \ldots P_1 D(\tau_1)|0\rangle \quad (2)$$

where $$D(\tau_k) = \exp(-i\mathcal{H}\tau_k)$$

In an NMR experiment one measures the amplitude and/or phase of the precessing resultant magnetic moment; its components in two perpendicular directions perpendicular to the z-axis are $M_x$ and $M_y$, which are proportional to the resultant spins $\langle I_x\rangle$ and $\langle I_y\rangle$; at time $t$ $$\langle I_x\rangle = \langle t|I_x|t\rangle$$

In a system canonically distributed initially, this expression is to be averaged over the ensemble.

The foregoing is a sketch of well known and established facts pertinent to pulsed NMR. It is recounted for the purpose of establishing a frame of reference and notation for the following sentences.

The state $|T\rangle$ given in Equation 2 can be denoted compactly by $$|T\rangle = \left\{\prod_{k=1}^{n}[P_k e^{-i\mathcal{H}\tau_k}]\right\}|0\rangle$$

where operators of lower index $k$ operate first. This can be rewritten as $$|T\rangle = \left\{\prod_{k=1}^{n} e^{-i\tau_k \mathcal{H}(nk)}\right\}\left\{\prod_{m=1}^{n} P_m\right\}|0\rangle$$

in which, by definition $$H_{nk} = \left\{\prod_{l=k}^{n} Pl\right\}\mathcal{H}\left\{\prod_{l=k}^{n}\right\}^{-1}$$

We now imagine that the n pulses are so chosen that $$\prod_{l=k}^{n} P_m = 1$$

Such a sequence will be called a cycle. A cycle has the property that, if it acted alone, without any internal Hamiltonian $\mathcal{H}$, the state of the spin system at the end of a cycle would be the same as before it: $|T\rangle = |0\rangle$.

After N cycles (time $t=NT$) the state of the system is $$|t\rangle = \left\{\prod_{l=k}^{n} e^{-i\tau_k \mathcal{H}(nk)}\right\}^N |0\rangle$$

Now if T is made sufficiently small, i.e., much smaller than the time $T_2$ required for the spin system to change appreciably under the influence of its internal Hamiltonian $\mathcal{H}$, the state of the system can be shown to approach one which would have been reached under an effective average Hamiltonian $\overline{\mathcal{H}}$ without any pulses.

$$|t\rangle \approx e^{-i\overline{H}t}|0\rangle$$

$$\overline{\mathcal{H}} = \sum_{k=1}^{n} \mathcal{H}(nk)\left(\frac{\tau_k}{T}\right) \quad (3)$$

As a result of (3), the detected magnetization signal sampled at the end (or at any other corresponding point) of each cycle traces out a set of values which are the same as those which would have been reached in the free induction decay of a sample whose internal Hamiltonian was $\overline{\mathcal{H}}$. Correspondingly, the Fourier transform of this samplied signal in the same as the CW spectrum of a spin system having Hamiltonian $\overline{\mathcal{H}}$. $\overline{\mathcal{H}}$ in general differs from the "true" Hamiltonian $\mathcal{H}$; indeed, the substance of this invention lies in the fact that the form of $\overline{\mathcal{H}}$ is under control of the experimenter through suitable choice of the pulses $P_k$ and weighting factors $\tau_k/T$, and can be so adjusted as to eliminate or minimize static dipolar interactions.

In order to do this we need only examine the form of the dipolar interactions given in (1). It is seen that it is necessary to choose the cycle in such a way that, for each pair of spins $(i, j)$, $$\overline{3I_{zi}I_{zj}} = \underline{I}_i \cdot \underline{I}_j = I_{xi} \cdot I_{xj} + I_{yi} \cdot I_{yj} + I_{zi} \cdot I_{zj}$$

There are very many cycles to which this is true.
Note that $$\underline{I}_i \cdot \underline{I}_j$$

is invariant to any magentic field pulse. $I_i$ is the dimensionless angular momentum operator referring to the spin of nucleus $i$, and $I_{xi}$, $I_{yi}+I_{zi}$ are its Cartesian coordinates.

The foregoing description images, for simplicity, that the pulses are infinitely short in duration and infinitely intense, so that each accomplishes a finite reorientation of the spins without any development of the spin system under the influence of $\mathcal{H}$ having occurred during the pulse. Even when this is not true, it is possible, to define an average Hamiltonian and choose it so as to minimize the effects of dipolar interactions.

This invention has been described in several articles including "Multiple Pulse NMR Experiments", by J. S. Waugh, C. H. Wang, L. M. Huber and R. L. Vold, Journal of Chemical Physics, 48, No. 2, 662 (1968) and "Approach to High-Resolution NMR in Solids", by J. S. Waugh, L. M. Huber and U Haeberlen, Physical Review Letters, 20, No. 5, 180 (1968). Since the above publications are readily available, repetition herein of the entire complex mathematical analysis contained in them is unnecessary. These articles and the background material therein, including the cited references, are incorporated herein by reference.

THE INVENTION—SPECIFIC PULSE CYCLES

This invention comprises the method of decreasing or eliminating the effects of static dipolar interactions and quadrupole splitting in NMR without eliminating the effects of resonance shifts and scalar couplings by applying to the sample material a repeated cycle of magnetic field pulses so chosen and so spaced in time that the average Hamiltonian for the former effects is zero or nearly zero, whereas the average Hamiltonian for the latter two is not. The realization of the invention is in two parts:

(1) The application of a repeated cycle of three or more pulses, the definition of a cycle being that the cumulative effect of the pulses in the cycle, acting along without other effects, would be to have the system of spins in substantially the same state as before the cycle. (The limitation of the invention to cycles of three or more pulses specifically exempts the Carr-Purcell cycle, Phys. Rev. 94, (1954) and the Waugh-Huber cycle, J. Chem. Phys. 47, 1862 (1967), which are established parts of the state of the art.)

(2) The choice of the pulses in the cycle and their occurrence in time in such a way that $\overline{\mathcal{H}}_d=0$, whereas $\overline{\mathcal{H}}_c$ and $\overline{\mathcal{H}}_J$ are not. (The Carr-Purcell cycle makes $\overline{\mathcal{H}}_c=0$. The Ostroff-Waugh sequence, Phys. Rev. Letters, 16, 1097 (1966), a cycle of four pulses, is distinguished from this invention for the same reason.)

There are many possible cycles of pulses which will satisfy these two parts for realization of the invention. Common to all these possible cycles is that the pulse timing is such that each spin spends an equal amount of time in each position that it has as a result of the pulse cycle, and that the pulse cycle be such that the spins be substantially in the same direction at the end of the cycle as they were at the beginning of the cycle. The pulse cycle also has the property that the orientations imparted to the spins by the pulses lie on a core whose axis lies at the "magic angle". Illustrative cycles will be considered in conjunction with the accompanying drawings in which:

Multiple 90° R.F. pulse cycles

Cycles which contain only pure R-F pulses to eliminate dipolar effects are particularly convenient to implement. Out of the many possibilities, we shall be interested in cycles in which (a) All pulses are 90° pulses (b) Each is applied along the $\pm x$ or $\pm y$ axis of the rotating frame; i.e., a maximum of four carrier phases need be provided in the laboratory (c) These pulses occur in subcycles of two pulses each, one pulse in the subcycle being the inverse of the other (e.g., $+x, -x$).

The usefulness of such cycles arises from the fact that the two-pulse subcycle by itself accomplishes a partial removal of dipolar effects to the extent that the interval between the pair of pulses is made small compared to the relaxation time $T_2$. The residue is further reduced by the next subcycle (e.g., $+y, -y$). The criterion for efficacy of this further reduction is that the total duration of the pair of subcycles be small compared to, not the original relaxation time $T_2$, but a longer effective relaxation time which reflects the partial renewal of dipolar effects by the subcycle. Progressive improvement may thus be built up by applying a complex subcycle composed of a nest of shorter and shorter subcycles, each of which accomplishes one further step in the removal of dipolar effects.

The notation used in this application to describe the rotation of the spin system and the phase of the R-F field relative to a rotating frame of reference is that which is customary in the literature where, for example, the notation $A°_{B°}$ signifies that the R-F pulse has a phase of $B°$ with respect to a reference phase and $A°$ signifies the degrees of rotation of the spin system in a plane orthogonal to the R-F field direction producing the rotation.

As an example of multiple 90° R-F pulse cycles, there are presented below illustrative four- and eight-pulse cycles.

Four-pulse cycle

Figure 3:
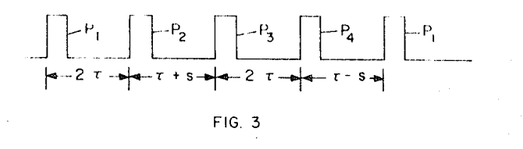
FIG. 3 is a four-pulse sequence illustrating one method of operation of the invention.

This mode of operation comprises the repeated application to a sample of matter containing gyromagnetic nuclei of a cycle of four 90° radio frequency carrier pulses, spaced in time with reference to two fixed intervals $\tau$ and $s$ in the manner ($P_1$; $2\tau$; $P_2$; $\tau+s$; $P_3$; $2\tau$; $P_4$; $\tau-s$), where $s$ is a positive or negative interval where magnitude is between 0 and $\tau$, where the pulses denoted by $P_1$ and $P_2$ differ from one another in carrier phase by approximately 180°, where $P_3$ and $P_4$ differ similarly from one another by approximately 180° in carrier phase, and where both $P_3$ and $P_4$ are in phase quadrature with both $P_1$ and $P_2$. The magnetic radio frequency pulses are perpendicular to the static magnetic field $H_0$. All pulses have intensity and duration which flip spins through 90° (or 270°, 450°, etc.) in the plane perpendicular to the R-F field direction. In the notation described earlier, the cycle may be written as $90°_{0°}$; $2\tau$; $90°_{180°}$; $(\tau+s)$; $90°_{90°}$; $2\tau$; $90°_{-90°}$; $(\tau+s)$. This pulse train is shown in FIG. 3.

Where $s=-\tau$, the time interval between the second and third pulses becomes zero, so that a single 180° pulse whose carrier is shifted by 90° in the middle of the pulse results.

The particular four-pulse cycle given above is seen capable of being modified without any change in substance by allowing the two-pulse subcycles to assume all possible carrier phase reversals. If the pulses are represented by the axial direction of their magnetic fields in the rotating frame, the $90°_{0°}$; $90°_{180°}$; $90°_{90}$; $90°_{-90}$ pulse cycle given above can be represented as $$x, -x, y, -y$$

However, there are three other combinations which produce the same effect on the magnetic moments. These are $$-x, x, y, -y$$
$$x, -x, -y, y$$
$$-x, x, -y, y$$

Figure 5:
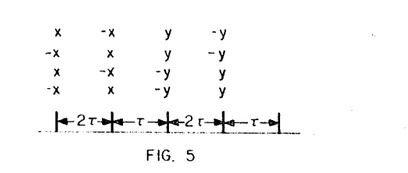
FIGS. 5 and 6 are timing diagrams for the four- and eight-pulse cycles.

It is recognized that these four pulse sequences are equivalent since the choice of the direction of the $x$ and $y$ axes was initially an arbitrary one. These four-pulse cycles are shown in FIG. 5 for the case $s=0$, a case of particular utility.

Figure 4:
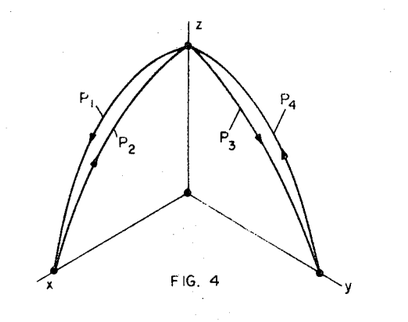
FIG. 4 is a vector-space representation of spin vector rotation during a four-pulse sequence.

The rotation of the gyromagnetic nuclei by this pulse sequence is shown in FIG. 4. For purposes of FIG. 4 it is assumed that the spin vector is in the $z$ direction before the application of any pulse. The same rotation will occur for all nuclei in the sample responsive to the R-F field of the pulses regardless of their spin vector directions with respect to the $z$ axis. Pulse $P_1$ is assumed to produce a field in the positive $y$ axis direction and to cause a 90° rotation of the spin vector about the $y$ axis so that the spin vector is in the $+x$ axis direction. Pulse $P_2$, being 180° out of phase with pulse $P_1$, is in the $-y$ axis direction and causes the spin vector to return to the $+z$ axis direction. Pulse $P_3$, being 90° out of phase with pulse $P_1$, is in $+x$ axis direction and causes the spin vector to rotate to the $+y$ axis direction. Pulse $P_4$ causes the spin vector to return to the $+z$ axis direction. Thus the cycle of pulses, $P_1$–$P_4$, causes the spin vector to return to its original position and to have occupied three symmetrical positions with respect to the body diagonal of the cube defined by the Cartesian axes of the rotating frame. Thus the spin vectors have been caused to appear to precess about the "magic axis" in much the same way as if they had been physically rotated about the magic axis. From group theory if three of more equally spaced samples are made around the periphery of circular orbit about the magic axis, the net dipole-dipole interaction will be zero. This effect has been achieved by the above four-pulse sequence where the time that the spins spend in each of the three directions has been caused to be the same.

The output signal waveforms and the spin resonances calculated therefrom by Fourier transform analysis is shown in FIG. 7 for four-pulse cycle of energization and for a Bloch (single pulse) energization.

Figures 7A, 7B:
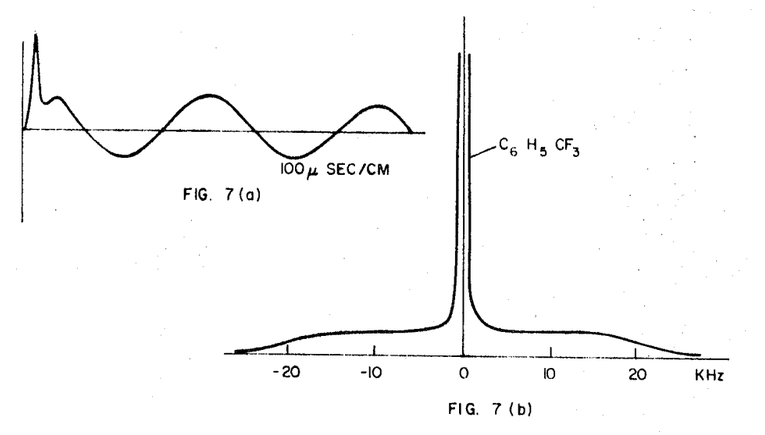
FIG. 7 shows the Bloch and four-pulse cycle spin decays and their Fourier transforms.

FIG. 7(a) shows the phase-detected F Bloch decay of a sample consisting of a small single crystal of $CaF_2$ wet with liquid $C_6H_5F_3$. The fast decay of the $CaF_2$ signal is followed by a much longer decay of the liquid signal, and the latter shows a sinusoidal modulation because the magnet was set slightly off resonance from the liquid signal.

The sampled precession signal of FIG. 7(b) was obtained by employing the four-pulse sequence with $\tau=6$ $\mu$sec. and $s=0$. Both components of the signal are visible for a relatively long time. The magnetization was detected at a given point in each cycle with a sample-and-hold circut. A compound modulation is obtained because there is a difference in chemical shift between the $CaF_2$ and $C_6H_5CF_3$ spins, and the dipolar interactions in the solid have been effectively removed.

According to a well known theorem, the Bloch decay is a Fourier transform of the unsaturated slow-passage spectrum. Accordingly, the Fourier transform of FIG. 7(b) is thereby the slow-passage spectrum which would be obtained from a system in which dipolar broadening had been removed and all chemical shifts had been reduced by $\sqrt{3}$. This scale factor has been accurately verified by means of extensive measurements on liquid samples, in which the beat frequency in the multiple-pulse experiment is compared with that for the Bloch decay, for varying offsets from resonance.

Figures 7C, 7D:
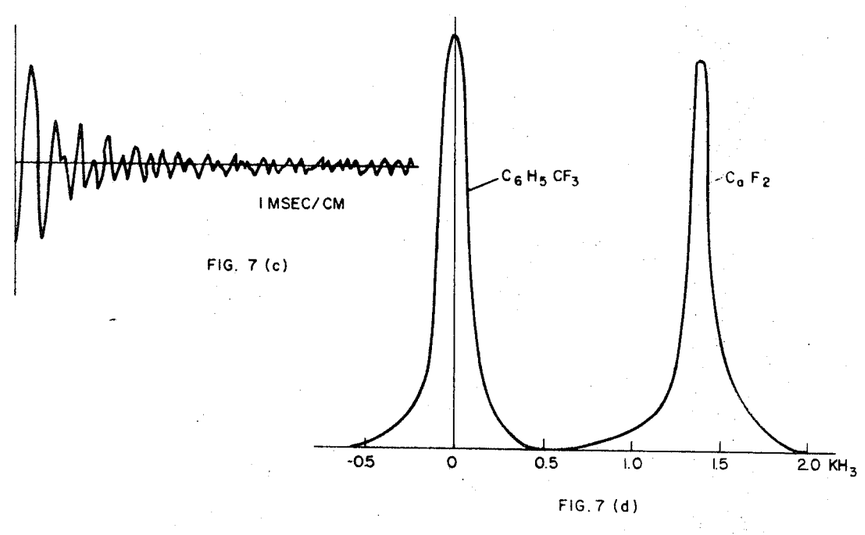

FIGS. 7(c) and 7(d) show the computed Fourier transforms of the decays in FIGS. 7(a) and 7(b), respectively. As expected, the dipolar broadening of the solid has been suppressed without loss of the chemical shift. The residual linewidths are largely governed by instrumental effects, including warping the Zeeman field by bulk diamagnetic effects associated with the highly nonideal sample geometry employed. In other experiments with slightly better geometry, linewidths more than three times smaller have been obtained.

The separation of the peaks in FIG. 7(d) corresponds, after applying the $\sqrt{3}$ scale factor, to a shift of the $CaF_2$ resonance from $C_6H_5CF_3$ by 43 p.p.m. in the direction of increased diamagnetic screening. This is of the same order of magnitude as the shift of 53 p.p.m. reported for aqueous $R^-$ vs. $C_6H_5CF_3$.

There appears to be no limit in principle to the extent to which static dipolar broadening can be reduced by this and related methods. In practice, measurements to date seem to be limited by (a) inhomogeneity of $H_0$, (b) inhomogeneity of the R-F field $H_1$, (c) the extent to which $T/T_2$ can be practically reduced, and (d) finite pulse width (1 $\mu$sec. in these experiments). These limitations can certainly be largely removed. (b) and (d) can be simultaneously removed to first order, for example, by using an eight-pulse cycle in which the first half is as described and the second half employs a reversal of all R-F phases.

The experiments reported here were performed with a single-coil pulse spectrometer operating at 54.0 mHz. and producing a peak rotating field of 60 oe.

Eight-pulse cycles

Figure 6:
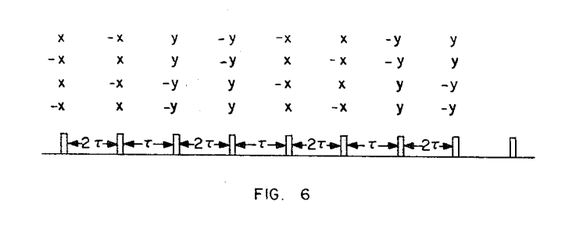

Since the R-F field $H_1$ is generally inhomogeneous over the sample, it may be impossible to provide the desired 90° rotation of spins through the entire sample; or for some other reason, such as incorrect pulse energy, the rotations of the spins in the cycle may not be exactly the correct value to return the spins to their starting point. It is found that an eight-pulse cycle composed of two complementary four-pulse cycles is very effective in cancelling deviations from the ideal cycle conditions. The eight-pulse cycle also cancels the effects of finite pulse width but has the characteristic that the chemical shift is reduced by another factor of $\sqrt{3}$ over the reduction of $\sqrt{3}$ produced by the four-pulse cycle. These eight-pulse cycles are shown in FIG. 6 for the case $s=0$. It should also be noted that the order of the two-pulse subcycles within the eight-pulse cycle can be rearranged from that shown in FIG. 6 while still retaining the characteristics of the eight-pulse cycle.

Although only the four- and eight-pulse cycles have been described, it is to be understood that longer pulse cycles, sixteen, etc., are possible. Examination of the equations for the various Hamiltonians disclosed that spin systems can be selectively affected by the proper choice of the four-pulse subcycles constituting the longer pulse cycle.

The three-pulse cycle

The repeated application of a cycle of three pulses of R-F carrier, each separated by a time $\tau$, the first $P_1$ and third $P_3$ pulses being 90° pulses in phase quadrature with each other, the second pulse $P_2$ being a 120° pulse whose phase is midway between that of the first and third pulses is another possible cycle in accordance with the invention. The direction of the magnetic field of the first and third pulses is along the $x$ and $y$ axes, respectively. The second R-F pulse is in time coincidence with a video pulse $\Delta H_0$ of magnetic field parallel to the static magnetic field $H_0$. The amplitude of pulse $\Delta H_0$ with respect to the amplitude of the R-F pulse $H_1$ being given by $$R_1/\Delta H_0 = \sqrt{2}$$

where the R-F field is rotating or $H_1/\Delta H_0 = 2\sqrt{2}$, if the R-F field is oscillatory. The oscillatory R-F field is used in most practical devices since it is obtained by a fixed coil energized by an R-F current. The resulting oscillatory field may be considered to be composed of two counter-rotating fields, each of half amplitude with only the one rotating in the same direction as the precessing magnetic movement being effective.

Figure 8:
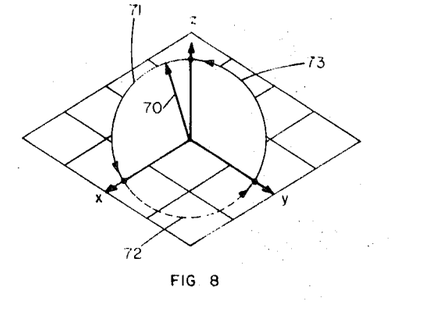
FIG. 8 is a vector-space representation of spin vector rotation during a three-pulse sequence.
Figure 9:
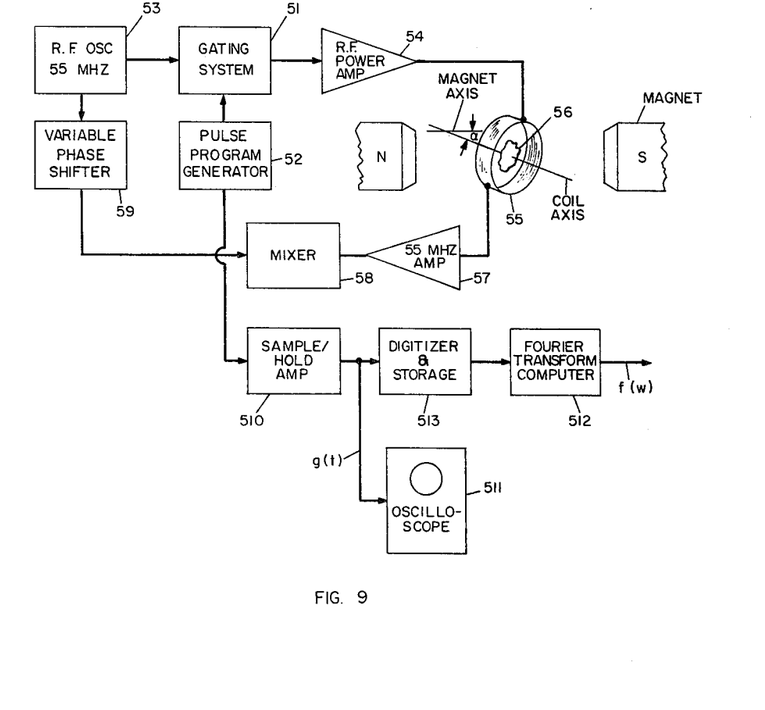
FIG. 9 is a block diagram of a spectrometer system.

The rotation of the magnetic moment 70 produced by the above pulse sequence is shown in FIG. 8. Pulse $P_1$ rotates moment 70 from the assumed $z$-axis through 90° in the plane along path 71. Pulse $P_2$ rotates moment 70 about the magic axis, which is on the body diagonal of a cube defined by the cartesian axes $x$, $y$ and $z$, along path 72 to the $y$ axis direction. The rotation produced by the pulse $P_2$ along path 72 is below the $xy$ plane and is represented by dotted path 72. The cross-hatching indicates the $xy$ plane. The last pulse $P_3$ in the cycle, rotates 73 moment 70 back to its starting point by a 90° rotation in the $yz$ plane.

As in the eight-pulse cycle consisting of a phase reversed four-pulse subcycle, reversal of the carrier phase by 180° in the succeeding cycle of pulses produces a six-pulse cycle having the same desirable characteristics.

The above described three- and six-pulse cycles used a video pulse acting in conjunction with a coincident R-F pulse on only one of the three pulses of the cycle or subcycle. Three such jointly acting pulses, each producing a 120° rotation about the magic axis, could have been used instead of the preceding cycle where two 90° pulses about the $x$ and $y$ axes were used together with a 120° pulse about the magic axis. For either pulse sequence the magnetic moment 70 would, if assumed to be initially along the $z$ axis, have the same positions namely along the $x$, $y$ and $z$ axes after each pulse. Again, phase reversal of the R-F carrier for a three-pulse subcycle following the initial three-pulse subcycle, provides a six-pulse cycle with the usual desirable properties.

It is seen that any integral number $n+3$ of R-F pulses when acting in conjunction with coincident video pulses so that each produces $360°/n$ rotation about the magic axis will also produce a suitable cycle of pulses. The ratio of the amplitudes of the R-F pulse to the video pulse is the same as required for a 120° rotation about the magic axis and only the time duration is reduced to get fewer degrees of rotation. For instance, a four-pulse cycle, $n=4$, or a four-pulse subcycle with phase reversal in each subcycle, with 90° rotation about the magic axis by each pulse is a possible cycle.

Instead of a video pulse in this and the subsequently discussed tilted coil apparatus, an effective $z$-axis component $\Delta H_0$ can be generated by setting the carrier frequency away from the exact resonance frequency $\omega_0$ by the proper amount:

$$\Delta H_0 = \gamma^{-1}(\omega - \omega_0)$$

The tilted coil modification

An important practical problem is that associated with inhomogeneity of $H_1$, which arises from radio frequency currents in a coil whose dimensions are not very large compared to the sample. The undesired effects of this inhomogeneity can be ameliorated by deriving $H_0$ and $H_1$ from suitable currents in one and the same coil. Suppose the coil is tilted so that its axis makes an angle $\alpha$ with the direction of $H_0$, which is set on exact resonance. The coil is now excited simultaneously by a DC current $I_{DC}$ and an oscillating radio frequency current of amplitude $I_{RF}$, which give rise to proportional magnetic fields of amplitude $H_{DC}$ and $H_{RF}$. These lead to secular Zeeman interactions in the rotating frame corresponding to a longitudinal field $H_z = H_{DC} \cos \alpha$ and a transverse field $H_x = \frac{1}{2} H_{RF} \sin \alpha$. It is $H_z$ and $H_x$ which must be adjusted to obtain the magic condition. This can be done by satisfying $$\frac{H_{RF}}{2H_{DC}} \tan \alpha = \sqrt{2}$$

Since $H_{DC}$ and $H_{RF}$ have the same geometrical inhomogeneity over the sample, the magic angle condition is everywhere maintained. (Note, however, that only variations in the magnitude, but not in the direction, of the coil field are fully compensated.)

As each R-F pulse is applied to the coil surrounding the sample, a video current pulse of the same width is simultaneously applied by a pulse generator. The pulser is prevented from loading the R-F transmitter by placing a notch filter resonant at the transmitter frequency in the line between the pulser and the coil. The orientation $\alpha$ of the coil in the Zeeman field is adjusted to meet the magic angle condition and was roughly 45°.

Double resonance

The preceding material has been presented under the tacit assumption that the spins in the sample are of a single species, so that a $\theta$ pulse for one is a $\theta$ pulse for all. When there are other spins present having sufficiently different gyromagnetic ratios that are unaffected by the pulses, their most important effect is exhibited in the dipolar coupling between resonant and nonresonant spins. A cycle of pulses on the resonant spins has no effect on the nonresonant spins which can therefore be treated as the sources of static local fields. These dipolar couplings thus affect the measured magnetization of the resonant spins in the same way as chemical shifts. The result, in a solid, will be that part of the dipolar broadening which arises from nonresonant spins will remain. When this broadening is a hindrance, it can be removed by a double resonance experiment in which the offending spins are saturated sufficiently strongly. A 180° pulse at the nonresonant frequency once each cycle or an intense steady field at the nonresonant frequency will effectively eliminate the nonresonant spin dipolar broadening.

Pulsed fields in conjunction with sample rotation

The preceding cycles of pulsed fields remove the dipolar interactions while reducing the isotropic and anisotropic chemical shifts by the scale factor $\sqrt{3}$ or 3. This is in contrast to the rotating sample method where the isotropic chemical shift is unchanged and the anisotropy of the chemical shift is eliminated in the process of elimination of the dipolar interactions.

However, the anisotropy of the chemical shifts contains useful information, and could be regarded as making the various rotating frame experiments potentially more fruitful than the high resolution NMR spectra of liquids. There may be situations, particularly when the sample is complex and not a single crystal, when the extra information constitutes an embarrassment of riches. In such a case one could suppress the anisotropic part of the shift by performing one of the rotating frame experiments and simultaneously spinning the sample at the magic angle, preferably making the spinning period an integral multiple of the pulse cycle time T. Note that the spinning rate need not ordinarily be so extremely large as in the pure rotating sample experiments: the pulsing is relied upon to suppress the dipolar broadening, leaving only the (usually smaller) anisotropy of the chemical shift to be removed by sample spinning. The spinning frequency need be large only compared to $\gamma H_0 \Delta \sigma$ where $\Delta \sigma$ is the anisotropy of the chemical shift rather than compared to $\gamma H_{loc}$, the former of these quantities being commonly much smaller than the second.

The apparatus

The apparatus used in practising the invention has as a principal part a conventional pulsed NMR spectrometer, but one where stability of radio frequency phase and pulse power and whose recovery from pulses have been improved to a degree required for the present use, this degree being substantially more refined than is required for prior uses.

In addition to the above, there was required a pulse programmer capable of generating the desired timing sequence; a means of producing and gating, on command of said programmer, a variety of different phases of the basic carrier frequency; and suitable means of processing the above-mentioned amplitude versus time signal to extract the desired information. Said processing means includes a sample-and-hold amplifier which selects the magnetization signal only at a given point in a cycle, and means for observing the Fourier transform of said samples signal.

Briefly, such spectrometers provide a uniform steady magnetic field $H_0$ along one assumed axis, a pulsed coherent radio frequency field along an orthogonal axis and a magnetic field signal pickup coil along this same axis or along a third axis orthogonal to these two axes. The signal in the pickup coil resulting from the gyromagnetic resonance of a test sample of material under observation located at the intersection of said axes when under the influence of the pulsed R-F field is detected and then applied to a cathode ray tube or other display to provide an amplitude versus time presentation.

Figure 10:
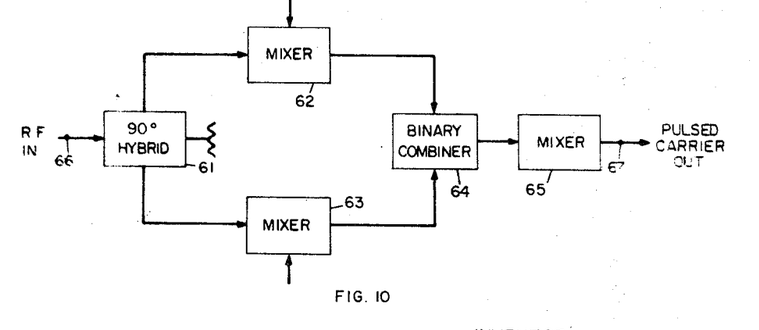
FIG. 10 is a block diagram of a four-pulse gating system for the spectrometer of FIG. 9.

The R-F gating system 51 for a four-pulse cycle is shown in detail in FIG. 10. The incoming continuous R-F voltage from oscillator 53 is applied to an Anzac 90° hybrid 61 to provide two output R-F signals at 90° phase difference from each other. These signals are applied to two HP 10514A mixers 62, 63, respectively, which are pulsed on by coincident pulses $P_1$, $P_2$, respectively. Pulses $P_1$ and $P_2$ are provided by a programmed pulse generator 52 and are either positive or negative pulses depending upon the desired R-F pulse phase, with respect to an arbitrary reference, as given in Table I.

TABLE I

| $P_1$ | $P_2$ | $P^c$ | Phase, ° | Direction of $H_1$ |
|---|---|---|---|---|
| + | + | + | 0 | $x$ |
| + | − | + | 90 | $y$ |
| − | + | + | 270 | $-y$ |
| − | − | + | 180 | $-x$ |

For each phase of R-F pulse $H_1$, the direction of the magnetic field of $H_1$ in the rotating frame of reference $\pm x_1$, $\pm y$ is also given. Each mixer 62, 63 produces either a 0° or 180° output signal with respect to its input depending upon whether a positive or negative pulse $P_1$, $P_2$ is applied to it. The outputs of the mixers 62, 63 are applied to an Anzac TV–50 binary combiner 64, which vectorially adds the mixer outputs to provide the desired phases and order of recurrence of the four pulses for a four-pulse cycle. A final mixer 65 of the same type is pulsed by a coincident positive pulse $P_3$ to provide additional isolation between input terminal 66 and output terminal 67. It is apparent that each pulse at output terminal 67 can be changed in phase by 180° by applying instead a negative pulse $P_3$. Thus, an eight-pulse cycle, wherein the last four pulses differ by 180° from the first four pulses, is obtained by causing pulse program generator 62 to provide four positive $P_3$ pulses followed by four negative $P_3$ pulses. Other combinations of output pulse phasing are provided in a similar manner by the appropriate modification of the pulse generator.

Figure 11:
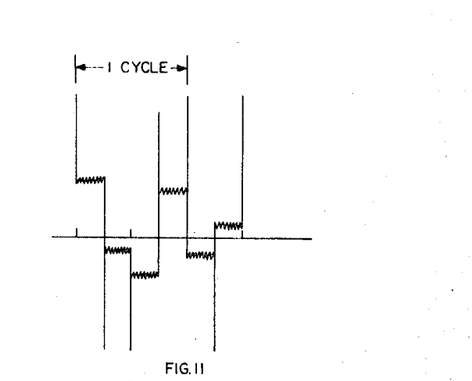
FIG. 11 is a typical signal output from the spectrometer of FIG. 9 operated in a four-pulse cycle mode.

The programmed R-F pulses from the amplifier 54 are provided to a small coil 55 around sample 56. Between pulses the signal produced by the spins of the sample provide a signal in coil 55 which is provided to amplifier 57. This signal is provided to mixer 58, where it is phase-detected with the continuous signal from variable phase shifter 59 to provide an output signal. A representative output signal of the free precession signal with noise and overload spikes is shown in detail in FIG. 11 for a four-pulse cycle. A sampling pulse occurring once each cycle during any one of the four interpulse times of a four-pulse cycle is provided by pulse generator 52 to the sample and hold-circuit 510. This particular interpulse interval chosen for the occurrence of the sample and hold pulse is preferably that pulse interval where the spins are in the general direction of the coil 55 axis for maximum signal output. As is the prior art, a single conditioning pulses may be applied prior to applying the repetitive cycle of pulses to achieve the same purpose, in which case the sampling pulse will occur during that pulse interval in each cycle where maximum output signal is obtained.

A representative output of the sample and hold circuit 510 is shown in FIG. 8(b) as it would be observed on oscilloscope 511. For purposes of providing the frequency shifts of the spins of the sample, the time-domain of the output signal of circuit 510 is Fourier-transformed by computer 512 to provide the frequency spectrum $f(\omega)$. Digitizer and storage unit 513 provide a stored digital signal for each analog level in the output of circuit 510 which is used as inputs to digital computer 512. A smoothing filter may be used before digitizing in order to improve performance where signal noise is significant.

The analysis presented in this specification presumes that 90° or other desired angles of spin rotations produced by the R.F. pulses occur instantaneously and that the pulse required to produce the rotation was of zero width. In practice, since the pulse power is limited, a finite pulse duration is required to produce the desired rotation. It is found that for the pulse widths of the order of a microsecond, the optimum rotation angle is several degrees less than that predicted for zero pulse width. This optimum angle is generally obtained by adjusting the pulse width for the optimum output signal. It should therefore be understood that the angle of rotation recited in the claims may in the practice of the invention be a slightly different angle.

It is apparent that there are many possible cycles using applied fields which are suitably modulated in amplitude and direction in the rotating frame, which have desirable properties of one sort or another in connection with the quest for high resolution NMR of solids. There have been considered here only certain simple classes of such experiments, where the field amplitudes are steady or modulated with square pulses, and where modulation is restricted to the four points of the compass in the rotating frame. The theoretical framework developed here and illustrated by application to these cycles is adapted to more general conditions as well. Doubtless many possibilities will occur to those skilled in the art.

What is claimed is:

1. In the method of operation of a magnetic resonance spectrometer in the study of the resonance of a material containing gyromagnetic nuclei where said spectrometer provides a pulsed source of magnetic field energization to said material immersed in a strong static magnetic field, the frequency of the R-F carrier being close to the natural gyromagnetic frequency of said nuclei in said static magnetic field, the improvement comprising:
    causing said source to provide a train of pulses comprising repetitions of a cycle of a fixed number of pulses, each cycle comprising at least three pulses, each said pulse accomplishing a rotation of the resultant magnetic moment of said nuclei through an angle determined by said pulse length and intensity, said rotation being about an axis in the direction of said pulse field in a coordinate system rotating about the direction of said static field at a frequency equal to the natural gyromagnetic frequency which said nuclei possesses in said static field in the absence of disturbance by their local surroundings, said angles, axes, and the intervals between said pulses being so adjusted that, in the absence of aid disturbance, said resultant magnetic moment in said rotating coordinate system
        (a) has substantially the same orientation immediately following the end of one cycle as immediately before its beginning,
        (b) takes on a succession of orientations during said cycle or part of said cycle such that the vector average of said orientations, each weighted by said interval during which it persists, lies in a direction which makes an angle of approximately 54°44′ with said static field, if said orientation immediately preceding said cycle was parallel said static field,
    said intervals moreover being made no greater than the transverse relaxation time of said resultant magnetic moment when it is subject to said disturbance, detecting the amplitude of said magnetic moment once during each cycle,
    whereby said adjustments reduce the detected effects of that part of said disturbance which is attributable to static dipole-dipole interactions among said nuclei without at the same time destroying the observed effects of that part of said disturbance which is attributable to resonance shifts or to scalar spin-spin interactions.

2. The method of claim 1 comprising in addition, sampling the output signal from the material being energized once during each cycle,
    storing said signals to provide a time versus amplitude output signal, and Fourier analyzing said time dependent signal to provide a frequency spectrum of the output signal of said material.

3. The method of claim 1 comprising in addition
sampling the output signal from the material being energized once during each cycle to provide an analog signal,
converting said analog signal to a digitalr signal,
storing said digital signals in ordered sequences, and
Fourier analyzing said stored digital signals by means of a digital computer.

4. The method of claim 1 wherein said train of pulses comprises the repeated application to a sample of said matter of a cycle of four 90° radio frequency carrier pulses from a coherent R-F source, the magnetic field of each pulse being transverse to said static magnetic field, said pulses of the cycle being spaced in time with reference to two fixed intervals $\tau$ and $s$ in the manner ($P_1$; $2\tau$; $P_2$; $\tau+s$; $P_3$; $2\tau$; $P_4$; $\tau-s$), where $s$ is a positive or negative interval between 0 and $\tau$, where the pulses denoted by $P_1$ and $P_2$ differ from one another in carrier phase by approximately 180°, where $P_3$ and $P_4$ also differ from one another in carrier phase by 180° and where both $P_3$ and $P_4$ are in phase quadrature with both $P_1$ and $P_2$, the time intervals between pulses being small with respect to the transverse relaxation time of said material.

5. The method of claim 4 comprising in addition,
sampling the output signal from the material being energized once during each cycle,
storing said sampled signals to provide a time versus amplitude output signal, and
Fourier analyzing said time depending signal to provide a frequency spectrum of the output signal of said material.

6. The method of claim 1 wherein said spectrometer provides a pulsed coherent radio frequency source of magnetic field energization to said material transverse to the static magnetic field of the spectrometer, wherein said train of pulses comprises the repeated application of a cycle of three pulses spaced by equal time intervals, each interval being less than the transverse relaxation time of said material, the first and third pulses being 90° radio frequency pulses in phase quadrature with each other, the second pulse being a 120° pulse comprising a radio frequency pulse of phase midway between said first and third pulse phases in coincidence with a video pulse providing a magnetic field in the static magnetic field direction, said R-F pulses producing a magnetic field transverse to said static magnetic field, the ratio of the amplitude of the rotating magnetic field of the radio frequency pulse $H_1$ to amplitude of the video pulse $\Delta H_0$ being $H_1/\Delta H_0 = \sqrt{2}$.

7. In the method of operation of claim 1, the improvement comprising repetitively applying a cycle of at least three equally spaced magnetic field pulses, each of which comprises a video pulsed magnetic field $\Delta H_0$ parallel to the large static magnetic field $H_0$ and simultaneously a pulsed coherent rotating R-F frequency field $H_1$ transverse to the direction of field $H_0$ of said pulses having magnitudes such that the ratio $H_1/\Delta H_0$ is approximately $\sqrt{2}$, the rotation produced by each pulse being 360° divided by the number of pulses in said cycle.

8. In the method of operation of claim 1 the improvement comprising repetitively applying a cycle of at least three equally spaced magnetic field pulses to the sample through a single coil surrounding the sample, the axis of said coil making an angle $\alpha$ with the direction of the static magnetic field $H_0$ each pulse comprising an R-F pulse and a video pulse, the ratio of the rotating component of the R-F pulse amplitude $H_1$ to the video pulse amplitude $\Delta H_0$ being $(H_1/\Delta H_0) \tan \alpha = \sqrt{2}$, the rotation produced by each pulse being 360° divided by the number of pulses in said cycle.

9. The method of claim 1 wherein said natural gyromagnetic frequency of said nuclei is a first frequency corresponding to the natural gyromagnetic frequency of some of the nuclei of said material,
compromising in addition applying to said material a magnetic field of a second frequency, said second frequency corresponding to the natural gyromagnetic frequency of other nuclei of said material.

10. The method of claim 9 wherein said second frequency is a 180° pulse occurring once during each cycle of said first frequency.

11. The method of claim 9 wherein said second frequency is an intense continuous frequency capable of saturating the nuclei whose natural gyromagnetic frequency is at said second frequency.

12. In the method of claim 1 comprising in addition, spinning said material about an axis at the magic angle at a velocity sufficient to suppress the anisotropic chemical shift contribution in the detected moment.

13. In the method of claim 1, the improvement comprising repetitively applying a cycle of at least three equally spaced R-F rotating magnetic field pulses transverse to the direction of the static field $H_0$, the frequency of the R-F carrier being displaced from the exact resonance frequency $\omega_0$ by an amount $\Delta H_0 = \gamma^{-1}(\omega - \omega_0)$ such that the ratio $H_1/\Delta H_0$ is approximately $\sqrt{2}$, the rotation produced by each pulse being 360° divided by the number of pulses in each cycle.

14. A magnetic resonance spectrometer for the study of the resonance of a material containing gyromagnetic nuclei of the type where said spectrometer provides a pulsed source of magnetic field energization to said material immersed in a strong static magnetic field, the frequency of the R-F carrier being close to the natural gyromagnetic frequency of said nuclei in said static magnetic field, the improvement comprising:
means for providing from said pulsed source a train of pulses comprising repetitions of a cycle of a fixed number of pulses, each cycle comprising at least three pulses, each said pulse accomplishing a rotation of the resultant magnetic moment of said nuclei through an angle determined by said pulse length and intensity, said rotation being about an axis in the direction of said pulse field in a coordinate system rotating about the direction of said static field at a frequency equal to the natural gyromagnetic frequency which said nuclei possesses in said static field in the absence of disturbance by their local surroundings, said angles, axes, and the intervals between said pulses being so adjusted that, in the absence of said disturbance, said resultant magnetic moment in said rotating coordinate system
  (a) has substantially the same orientation immediately following the end of one cycle as immediately before its beginning,
  (b) takes on a succession of orientations during said cycle or part of said cycle such that the vector average of said orientations, each weighted by said interval during which it persists, lies in a direction which makes an angle of approximately 54°, 44' with said static field, if said orientation immediately preceding said cycle was parallel said static field,
said intervals moreover being made no greater than the transverse relaxation time of said resultant magnetic moment when it is subject to said disturbance, detecting the amplitude of said magnetic moment once during each cycle,
whereby said adjustments reduce the detected effects of that part of said disturbance which is attributable to static dipole-dipole interactions among said nuclei without at the same time destroying the observed effects of that part of said disturbance which is attributable to resonance shifts or to scalar spin-spin interactions.

15. The apparatus of claim 14 comprising in addition
means for sampling the output signal from the material being energized once during each cycle,
means for storing said sampled signals, and
means for Fourier analyzing said stored signals to provide a frequency spectrum of said material.

16. The apparatus of claim 14 wherein said train of pulses comprises the repeated application to a sample of said matter of a cycle of four 90° radio frequency carrier pulses from a coherent R-F source, the magnetic field of each pulse being transverse to said static magnetic field, said pulses of the cycle being spaced in time with reference to two fixed intervals $\tau$ and $s$ in the manner ($P_1$; $2\tau$; $P_2$; $\tau+s$; $P_3$; $2\tau$; $P_4$; $\tau-s$), where $s$ is a positive or negative interval between 0 and $\tau$, where the pulses denoted by $P_1$ and $P_2$ differ from one another in carrier phase by approximately 180° in carrier phase, and where both $P_3$ and $P_4$ are in phase quadrature with both $P_1$ and $P_2$, the time intervals between pulses being small with respect to the transverse relaxation time of said material.

17. The apparatus of claim 16 comprising in addition
means for sampling the output signal from the material being energized once during each cycle,
means for storing said sampled signals, and
means for Fourier analyzing said stored signals to provide a frequency spectrum of said material.

References Cited
UNITED STATES PATENTS 3,474,329  10/1969  Waugh _______________ 324—.5

RUDOLPH V. ROLINEC, Primary Examiner

M. J. LYNCH, Assistant Examiner